United States Patent Office 2,833,636
Patented May 6, 1958

2,833,636

STABILIZATION OF ORGANIC COMPOUNDS

William K. T. Gleim, Orland Park, Ill., assignor to Universal Oil Products Company, Des Plaines, Ill., a corporation of Delaware No Drawing. Application January 12, 1954
Serial No. 403,660

12 Claims. (Cl. 44—75)

This invention relates to a stabilization process and more particularly to a novel method of retarding and/or preventing deterioration of unstable compounds.

Many unstable substances undergo deterioration during storage, transportation and/or treatment, resulting in the formation of undesirable gum, discoloration, rancidity and other deleterious products, due to oxidation, polymerization or other undesired reactions. The deterioration of the unstable substances may be retarded and/or prevented by the novel method of the present invention. For example, the present invention may be utilized for the stabilization of hydrocarbon distillates including motor fuel, particularly unsaturated gasolines as, for example, cracked gasoline, polymer gasoline, etc., kerosene, diesel oil, mineral oil, lubricating oil, fuel oil, drying oil, etc., fatty materials including edible fats and oils, which may be of mineral, animal or vegetable origin, foods, rubber, plastics, resins, waxes, monomers, adhesives, photographic developers, etc.

The present invention is particularly applicable to the stabilization of cracked gasoline as it has been found that the novel additive of the present invention is extremely effective in low concentrations and therefore offers economical advantages.

The present invention also is particularly applicable to the stabilization of rubber, both natural and synthetic, to prevent cracking thereof, which occurs during use when subjected to air, ozone, heat and/or light. This tendency to crack is considerably accelerated in the presence of ozone.

In one embodiment the present invention relates to a method of stabilizing an unstable substance which comprises adding thereto an inhibitor comprising an N-aryl-ortho-aminophenol.

In a specific embodiment the present invention relates to a method of stabilizing gasoline against deterioration which comprises incorporating therein from about 0.001% to about 1% by weight of N-phenyl-ortho-aminophenol.

In another specific embodiment the present invention relates to a method of stabilizing rubber against cracking which comprises incorporating therein from about 0.001% to about 5% by weight of N-phenyl-ortho-aminophenol.

In another embodiment the present invention relates to an organic substance containing a stabilizing amount of an N-aryl-ortho-aminophenol.

The use of inhibitors to stabilize organic substances has been studied extensively and many compounds have been proposed for use as inhibitors. Included in the compounds proposed as inhibitors are aminophenols but, in the past, it has been found that effective inhibitors are obtained only when using para-aminophenols and derivatives of the paraaminophenols. The meta-aminophenols has not shown promise as inhibitors and, therefore, have not been as extensively studied as have the para-aminophenols. I have now found, contrary to prior investigations, that ortho-aminophenol derivatives of a particular class are effective inhibitors. The ortho-aminophenol derivative must be an N-aryl-ortho-aminophenol and particularly N-phenyl-ortho-aminophenol. As will be shown in the following examples N-phenyl-ortho-aminophenol is a very effective inhibitor, whereas N-alkyl-ortho-aminophenol compounds possess very little inhibitor properties.

Of the N-aryl-ortho-aminophenol for use in accordance with the present invention, N-phenyl-ortho-aminophenol is preferred. In some cases N-naphthyl-ortho-aminophenol and N-anthryl-ortho-aminophenol may be employed, but not necessarily with equivalent results.

As hereinbefore set forth, the preferred inhibitor comprises N-phenyl-ortho-aminophenol. For use in most substrates there does not appear to be any advantage to utilizing derivatives of this compound, the derivative having one or more hydrocarbon or other substituents attached to either phenyl ring and/or to the nitrogen atom. However, in some cases, advantages are obtained when using N-aryl-ortho-aminophenols containing such substituents and, in these cases, the substituents may be selected from alkyl, aralkyl, aryl, alkaryl, cycloalkyl, heterocyclic, etc., or substituents containing oxygen, nitrogen and/or sulfur. As a general rule, the total number of carbon atoms in the substituent or substituents should not exceed about 15, although in certain cases the total number of carbon atoms may be larger. Illustrative compounds in this class include N-methyl-N-phenyl-ortho-aminophenol, N-ethyl-N-phenyl-ortho-aminophenol, N-propyl-N-phenyl-ortho-aminophenol, N-butyl-N-phenyl-ortho-aminophenol, N-amyl-N-phenyl-ortho-aminophenol, N-hexyl-N-phenyl-ortho-aminophenol, N-heptyl-N-phenyl-ortho-aminophenol, N-octyl-N-phenyl-ortho-aminophenol, etc., N-(2-methylphenyl)-ortho-aminophenol, N-(2-ethylphenyl)-ortho-aminophenol, N- (2-propylphenyl)-ortho-aminophenol, N-(2-butylphenyl)-ortho-aminophenol, etc., N-3-methylphenyl)-ortho-aminophenol, N-(3-ethylphenyl)-ortho-aminophenol, N-(3-propylphenyl)-ortho-aminophenol, N-(3-butylphenyl)-ortho-aminophenol, etc.; N-(4-methylphenyl)-ortho-aminophenol, N-(4-ethylphenyl)-ortho-aminophenol, N-(4-propylphenyl)-ortho-aminophenol, N-(4-butylphenyl)-ortho-aminophenol, etc., N-(2,4-dimethyl-phenyl)-ortho-aminophenol, N-(2,4-diethyl-phenyl)-ortho-aminophenol, N-(2,4-dipropyl-phenyl)-ortho-aminophenol, N-(2,4,-dibutyl-phenyl)-ortho-aminophenol, etc., N-(2-methyl-4-ethyl-phenyl)-ortho-aminophenol, N-(2-methyl-4-propyl-phenyl)-ortho-aminophenol, etc., N-(2-ethyl-4-methyl-phenyl)-ortho-aminophenol, N-(2-ethyl-4-propyl-phenyl)-ortho-aminophenol, N-(2-ethyl-4-butyl-phenyl)-ortho-aminophenol, etc., N-(2,4,6-trimethyl-phenyl)-ortho-aminophenol, N-(2,4,6-triethyl-phenyl)-ortho-aminophenol, N-(2,4,6-tripropyl-phenyl)-ortho-aminophenol, etc. It is understood that the various compounds which may be used in accordance with the present invention are not necessarily equivalent in the same or different substrates.

Another advantage to the use of N-phenyl-ortho-aminophenol as an inhibitor is that it exerts a synergistic effect with certain other compounds. As will be shown by the following examples, the use of N-phenyl-ortho-aminophenol in conjunction with diethylene triamine results in considerably higher stability periods. These improved results are obtained in spite of the fact that diethylene triamine itself does not function as an inhibitor. While diethylene triamine is preferred, other suitable alkylene polyamines may be employed. Other alkylene polyamines include ethylene diamine, propylene diamine, butylene diamine, amylene diamine, hexylene diamine, heptylene diamine, octylene diamine, etc., dipropylene triamine, dibutylene triamine, diamylene triamine, dihexylene triamine, diheptylene triamine, dioctylene triamine, etc., alkyl ethylene diamine, alkyl propylene diamine, alkyl butylene diamine, alkyl amylene diamine, alkyl hexylene diamine, etc., in which the alkyl group may contain from 1 to 20 or more carbon atoms.

Another class of compounds with which N-phenyl-ortho-aminophenol exerts a synergistic effect is N,N'-dialkyl-p-phenylene diamine. As will be shown in the following examples, the use of both N-phenyl-ortho-aminophenol and N,N'-di-secondary-butyl-p-phenylene diamine results in inhibitor potencies in excess of those expected due to the inhibitor properties of each compound. Any suitable N,N'-di-substituted-p-phenylene diamine may be employed. The specific compound generally will be selected to meet the requirements of the particular substrate in which it is to be used. Specific N,N'-di-substituted-p-phenylene diamines include N,N'-di-propyl-p-phenylene diamine, N,N'-di-butyl-p-phenylene diamine, N,N'-di-amyl-p-phenylene diamine, N,N'-di-hexyl-p-phenylene diamine, N,N'-di-heptyl-p-phenylene diamine, N,N'-di-octyl-p-phenylene diamine, N,N'-di-nonyl-p-phenylene diamine, N,N'-di-decyl-p-phenylene diamine, N,N'-di-undecyl-p-phenylene diamine, N,N'-di-dodecyl-p-phenylene diamine, etc., as well as N,N'-di-substituted-p-phenylene diamines in which the substituents are selected from aryl, alkaryl, aralkyl, cycloalkyl, etc. groups. In some cases the N,N,N',N'-tetra-substituted-p-phenylene diamines may be employed but not necessarily with equivalent results.

The N-aryl-ortho-aminophenol may be prepared in any suitable manner. For example, N-phenyl-ortho-aminophenol may be prepared by the reaction of aniline with catechol at a temperature of from about 150 to about 250° C. in the presence of sulfanilic acid catalyst. Other methods include the use of calcium chloride as a catalyst, or the reaction of ortho-aminophenol with bromobenzene in the presence of copper iodide, etc. When the substituted compounds are to be prepared, reactants containing the desired substituents are selected or the substituents may be added subsequently by a suitable condensation reaction.

The N-aryl-ortho-p-aminophenol generally is incorporated in the organic substance to be stabilized in an amount of not more than about 5% by weight, depending upon the specific substrate in which it is used, although higher concentrations may be used in some cases. For example, when used in gasoline and other petroleum distillates, the additive generally will be utilized in a concentration of from about 0.0001% to about 1% by weight. When used in rubber, it may be utilized in a concentration of from about 0.001% to about 5% by weight. When the inhibitor compound of the present invention is utilized in conjunction with other additives, it generally will be used in amounts hereinbefore set forth and the other additive is utilized in equal concentrations or in amounts below that of the inhibitor. Thus, for example, the inhibitor may be used in gasoline in a concentration of 0.0001% to about 1% and the other additive may be used in a concentration of from about 0.00001% to about 0.5%. When it is used along with another inhibitor, both may be used in the same concentrations or either one may be used in a larger concentration. It is understood that the additive or additives may be used in conjunction with still other additives which are to be incorporated in the substrate for specific purposes. For example, when used in gasoline, tetraethyl lead, metal deactivator, dye, etc., may be employed. On the other hand, when used in rubber, accelerators, softeners, etc., are generally utilized. When desired, the inhibitor of the present invention may be prepared as a composite with the other additives and marketed as a single commodity of manifold purpose.

In some cases, it may be desirable to treat the substrate with acid, alkali, etc., to increase the susceptibility thereof to the addition of the inhibitor. For example, gasoline may be treated with sulfuric or other acid, caustic (sodium hydroxide), solution of caustic and alcohol and particularly methanol, etc. prior to the incorporation of the inhibitor therein.

The following examples are introduced to illustrate further the novelty and utility of the present invention but not with the intention of unduly limiting the same.

EXAMPLE I

The gasoline used in this example was a Pennsylvania thermally cracked gasoline which had been treated with caustic-methanol and which had an uninhibited induction period of 60 minutes. Table I reports the results of the incorporation of various additives to different samples of this gasoline.

Table I

| Additive | Induction period, Minutes |
|---|---|
| 0.0005% by weight of N-phenyl-ortho-aminophenol | 163 |
| 0.001% by weight of N,N'-di-secondary-butyl-p-phenylene diamine | 165 |
| 0.0005% by weight of N-phenyl-ortho-aminophenol and 0.001% by weight of N,N'-di-secondary-butyl-p-phenylene diamine | 295 |

The data in Table I illustrate the high potency of N-phenyl-ortho-aminophenol as an inhibitor. It will be noted that 0.0005% of N-phenyl-ortho-aminophenol produced an induction period equal to that obtained with 0.001% by weight of N,N'-di-secondary-butyl-p-phenylene diamine, the latter being a commercial inhibitor now used extensively in gasoline. Thus, equivalent results were obtained by employing only one-half the concentration of N-phenyl-ortho-aminophenol.

The data in Table I also illustrate the synergistic effect obtained through the use of both N-phenyl-ortho-aminophenol and N,N'-di-secondary-butyl-p-phenylene diamine. The actual increase due to the addition of N-phenyl-ortho-aminophenol is 103 minutes (163 minus the uninhibited induction period of the gasoline of 60 minutes). The actual increase due to the addition of N,N'-di-secondary-butyl-p-phenylene diamine is 105 minutes (165 minus 60 minutes). 103 plus 105 minutes equals 208 minutes, which is the expected increase due to the addition of both inhibitors. In contrast, it will be noted that the induction period was raised to 295 minutes, which minus 60 equals 235 minutes, thus showing an increase above that expected. This illustrates the synergistic effect obtained through the use of both inhibitors.

EXAMPLE II

The gasoline used in this example was a Pennsylvania thermally cracked gasoline which had been treated with caustic-methanol solution and which had an uninhibited induction period of 70 minutes. Table II reports the results of the incorporation in different samples of the gasoline of different amounts of the additives referred to in Example I.

Table II

| Additive | Induction period, Minutes |
|---|---|
| 0.001% by weight of N-phenyl-ortho-aminophenol | 360 |
| 0.003% by weight of N,N'-di-secondary-butyl-p-phenylene diamine | 258 |

It will be noted that only one-third as much of N-phenyl-ortho-aminophenol produced a higher induction period than the larger amount of N,N'-di-secondary-butyl-p-phenylene diamine. This again illustrates the improved results obtained with low concentrations of the inhibitor of the present invention.

EXAMPLE III

The gasoline in this example was an untreated Pennsylvania thermally cracked gasoline which had an induction period of 70 minutes. Table III reports the results of the incorporation of additives to different samples of this gasoline.

Table III

| Additive | Induction period, Minutes |
| --- | --- |
| 0.001% by weight of N-phenyl-ortho-aminophenol | 280 |
| 0.001% by weight of N-phenyl-ortho-aminophenol and 0.0004% by weight of diethylene triamine | 350 |

Diethylene triamine by itself has substantially no effect on the induction period of the gasoline. In contrast, it will be noted that the use of diethylene triamine with N-phenyl-ortho-aminophenol resulted in an increase in induction period of 70 minutes over that obtained by the use of N-phenyl-ortho-aminophenol alone.

EXAMPLE IV

The gasoline used in this example was a Pennsylvania thermally cracked gasoline which had been treated with caustic-methanol and which had an uninhibited induction period of 50 minutes. Table IV reports the results of the incorporation of various additives to different samples of this gasoline.

Table IV

| Additive | Induction period, Minutes |
| --- | --- |
| 0.003% by weight or ortho-aminophenol | 280 |
| 0.003% by weight of N-n-butyl-p-aminophenol | 325 |
| 0.003% by weight of N-phenyl-ortho-aminophenol | 550 |

The data in the above table illustrate the unexpected higher potency of N-phenyl-ortho-aminophenol in the gasoline of this example as compared to ortho-aminophenol and N-n-butyl-p-aminophenol, the last named compound being a commercial inhibitor used extensively in gasoline.

EXAMPLE V

The gasoline used in this example was a different thermally cracked gasoline and had not been given any pretreatment prior to incorporation of the additives. This gasoline had an uninhibited induction period of 55 minutes. The results of the incorporation of various additives to different samples of this gasoline are reported in Table V.

Table V

| Additive | Induction period, Minutes |
| --- | --- |
| 0.0005% by weight of N-phenyl-ortho-aminophenol | 153 |
| 0.0005% by weight of N-phenyl-meta-aminophenol | 58 |
| 0.0005% by weight of N-phenyl-para-aminophenol | 70 |

From the data in the above table, it will be noted that the N-phenyl-ortho-aminophenol is considerably better than the corresponding meta and para substituted compounds.

EXAMPLE VI

In addition to the higher potencies of N-phenyl-ortho-aminophenol as illustrated by Examples I through V, N-phenyl-ortho-aminophenol reduces the A. S. T. M. gum content of the gasoline to a lower amount than with other additives. This is illustrated in the following table which compares the results obtained with N-phenyl-ortho-aminophenol and with N,N'-di-secondary-butyl-p-phenylene diamine.

Table VI

| Additive | A.S.T.M. Gum, Mg. |
| --- | --- |
| 0.0001% by weight of N-phenyl-ortho-aminophenol | 0.7 |
| 0.003% by weight of N,N'-di-secondary-butyl-p-phenylene diamine | 9.3 |
| 0.0005% by weight of N-phenyl-ortho-aminophenol and 0.001% by weight of N,N'-di-secondary-butyl-p-phenylene diamine | 3.6 |

In comparing the results of the first two tests, it will be noted that 0.001% of N-phenyl-ortho-aminophenol was very effective in reducing the gum content of the gasoline and was considerably better than three times as much of the N,N'-di-secondary-butyl-p-phenylene diamine.

The data in the above table also illustrates the synergistic effect of N-phenyl-ortho-aminophenol and N,N'-di-secondary-butyl-p-phenylene diamine in reducing the gum content of the gasoline.

EXAMPLE VII

This example illustrates the use of the additive of the present invention in rubber. 3% by weight of N-phenyl-ortho-aminophenol is incorporated in a commercial rubbery butadiene-styrene copolymer composition containing the usual ingredients of carbon black, zinc oxide, sulfur, etc. The ingredients are combined on a rubber mill in the conventional manner and then the mix is cured.

Upon exposure to ozone in a concentration of 80 parts of ozone to 100 million parts of air, the rubber containing N-phenyl-ortho-aminophenol undergoes considerably less cracking than encountered with a similar sample of the rubber not containing the additive.

EXAMPLE VIII

N-naphthyl-ortho-aminophenol incorporated in a concentration of 0.2% by weight in paraffin wax to retard oxidative deterioration thereof.

EXAMPLE IX

N - (2 - tert - butyl - 4 - methyl - phenyl) - ortho-aminophenol may be utilized to stabilize lard having a normal stability period of about 6 hours as determined by the active oxygen method. This method is a standard test for determining stability of lard and in general comprises bubbling air through a sample of the lard and periodically determining the peroxide number of the lard. The results are reported as the number of hours required to reach a peroxide number of 20. 0.015% by weight of N - (2 - tert - butyl - 4 - methyl - phenyl) - ortho-aminophenol may be added to the lard.

I claim as my invention:

1. A substance selected from the group consisting of hydrocarbon and fatty materials subject to deterioration in storage containing, as an inhibitor for said deterioration, a stabilizing amount of N-aryl-ortho-aminophenol.

2. An organic substance selected from the group consisting of hydrocarbon and fatty materials subject to deterioration in storage containing, as an inhibitor for said deterioration, a stabilizing amount of N-phenyl-ortho-aminophenol.

3. A hydrocarbon material subject to deterioration in storage containing, as an inhibitor for said deterioration, a stabilizing amount of N-phenyl-ortho-aminophenol.

4. Gasoline normally subject to oxidative deterioration containing a stabilizing amount of N-aryl-ortho-aminophenol.

5. Gasoline normally subject to oxidative deterioration containing a stabilizing amount of N-phenyl-ortho-aminophenol.

6. Cracked gasoline containing from about 0.0001% to about 1% by weight of N-phenyl-ortho-aminophenol.

7. Rubber containing a stabilizing amount of N-aryl-ortho-aminophenol.

8. Rubber containing from about 0.001% to about 5% by weight of N-phenyl-ortho-aminophenol.

9. Cracked gasoline containing from about 0.0001% to about 1% by weight of N-phenyl-ortho-aminophenol and from about 0.00001% to 0.5% by weight of diethylene triamine.

10. Cracked gasoline containing from about 0.0001% to about 1% by weight of N-phenyl-ortho-aminophenol and from about 0.00001% to about 0.5% by weight of N,N'-di-secondary-butyl-p-phenylene diamine.

11. Gasoline normally subject to oxidative deterioration containing from about 0.0001% to about 5% by weight of N-aryl-ortho-aminophenol and from about 0.00001% to about 0.5% by weight of a compound selected from the group consisting of alkylene polyamine and N,N'-di-alkyl-p-phenylene diamine.

12. Gasoline normally subject to oxidative deterioration containing from about 0.00001% to about 5% by weight of N-phenyl-ortho-aminophenol and from about 0.00001% to about 0.5% by weight of a compound selected from the group consisting of diethylene triamine and N,N'-di-secondary-butyl-p-phenylene diamine.

References Cited in the file of this patent

UNITED STATES PATENTS

| | | |
|---|---|---|
| 2,081,130 | Atwell | May 25, 1937 |
| 2,275,311 | Pedersen et al. | Mar. 3, 1942 |
| 2,305,676 | Chenicek | Dec. 22, 1942 |
| 2,687,377 | Stewart et al. | Aug. 24, 1954 |
| 2,729,691 | DePree | Jan. 3, 1956 |

OTHER REFERENCES

Industrial and Engineering Chemistry, November 1952, pages 2721–2725.